(12) United States Patent
Sternsher

(10) Patent No.: US 12,708,487 B2
(45) Date of Patent: Aug. 18, 2026

(54) DENTAL MATRIX SYSTEM AND METHOD FOR FILLING CAVITIES

(71) Applicant: David Sternsher, Glendale, AZ (US)

(72) Inventor: David Sternsher, Glendale, AZ (US)

( * ) Notice: Subject to any disclaimer, the term of this patent is extended or adjusted under 35 U.S.C. 154(b) by 110 days.

(21) Appl. No.: 18/617,104

(22) Filed: Mar. 26, 2024

(65) Prior Publication Data

US 2025/0302584 A1 Oct. 2, 2025

(51) Int. Cl.
*A61C 5/85* (2017.01)
*A61C 5/88* (2017.01)

(52) U.S. Cl.
CPC . *A61C 5/85* (2017.02); *A61C 5/88* (2017.02)

(58) Field of Classification Search
CPC .................................... A61C 5/88; A61C 5/85
See application file for complete search history.

(56) References Cited

U.S. PATENT DOCUMENTS

2008/0064012 A1* 3/2008 Clark ....................... A61C 5/85
433/226

* cited by examiner

*Primary Examiner* — Edward Moran
*Assistant Examiner* — Christine L Nelson
(74) *Attorney, Agent, or Firm* — Bruce A. Lev

(57) ABSTRACT

An improved dental matrix system and method for filling cavities located on a side portion of a tooth, including a dental matrix, a dental spring ring, and an improved interproximal elastomeric dental wedge having a wedge section, wherein when in use the dental matrix is placed adjacent the side of a tooth that has a cavity, the dental wedge is placed between the dental matrix and an adjacent tooth, then the dental spring ring is placed around the adjacent tooth and contacts the dental matrix on opposite side portions thereof to hold it in place against the tooth that has the cavity, such that when pulling on the end of the dental wedge it becomes elongated and pulls the wedge section further between the adjacent tooth and the dental matrix thereby pushing the dental matrix toward and holding tightly against the tooth that has the cavity.

16 Claims, 8 Drawing Sheets

DENTAL MATRIX SYSTEM AND METHOD FOR FILLING CAVITIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to filling cavities in teeth, and more specifically to apparatuses for filling cavities that are located on the side portion of a tooth.

2. Description of the Related Art

Prior art dental matrix systems used to fill cavities in the side portion of teeth include dental matrices, spring clips, and wedges. However, the prior art wedges used do not sufficiently wedge, push, and hold the matrix against the tooth adjacent the cavity. As such, portions of the matrix, usually the bottom portion placed near the gum line, is loose and moves away from the tooth such that when filling the cavity the resultant filling is incomplete and/or extends outwardly from the natural surfaces of the tooth. This results in food and floss to be caught in between the filled tooth and an adjacent tooth, which can lead to further deterioration of the tooth and possible dislodgement of fillings from the tooth.

Accordingly, the present invention overcomes the disadvantages associated with the prior art, by providing an improved dental matrix system and method for filling cavities located on a side portion of a tooth that includes an improved inter-proximal elastomeric dental wedge placed between a dental matrix and an adjacent tooth, such that when pulling on the improved wedge's tab end, and subsequently its wedge end, the dental wedge elongates and pulls its center portion further between the adjacent tooth and the dental matrix thereby wedging and pushing the dental matrix toward and holding tightly against the tooth that has a cavity.

BRIEF SUMMARY OF THE INVENTION

In view of the foregoing disadvantages inherent in the known types of dental matrix systems or the like in the prior art, the present invention provides an improved dental matrix system and method for filling cavities located on a side portion of a tooth, including a dental matrix having a curved cross-section, a dental spring ring, and an improved inter-proximal elastomeric dental wedge having a tab end, a center portion including a wedge section, and a wedge end, wherein when in use the dental matrix is placed adjacent the side of a tooth that has a cavity, then the dental wedge is placed between the dental matrix and an adjacent tooth, then the dental spring ring is placed around the adjacent tooth and contacts the dental matrix on opposite side portions thereof to hold it in place against the tooth that has the cavity, such that when pulling on the tab end of the dental wedge, and subsequently the wedge end, the dental wedge becomes elongated and pulls the center portion further between the adjacent tooth and the dental matrix thereby wedging and pushing the dental matrix toward and holding tightly against the tooth that has the cavity. Once the improved dental matrix system is properly in place the cavity can be filled and set more easily and precisely, and in following, the improved dental matrix system removed, with all the advantages of the prior art and none of the disadvantages.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

Figure 1:
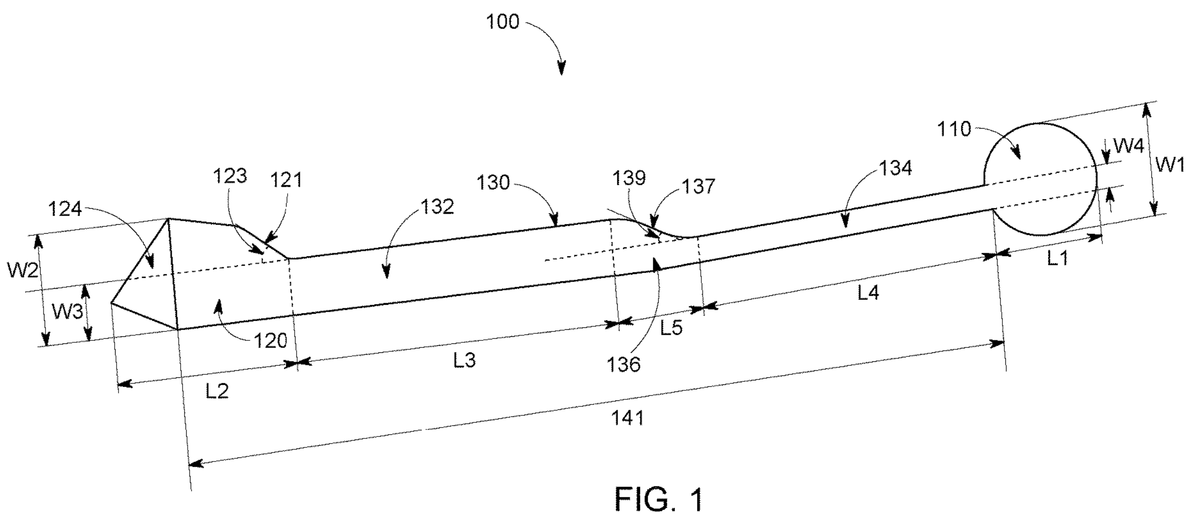
FIG. 1 shows a top view of the improved inter-proximal elastomeric dental wedge of the improved dental matrix system and method for filling cavities according to the preferred embodiment of the present invention.
Figure 2:
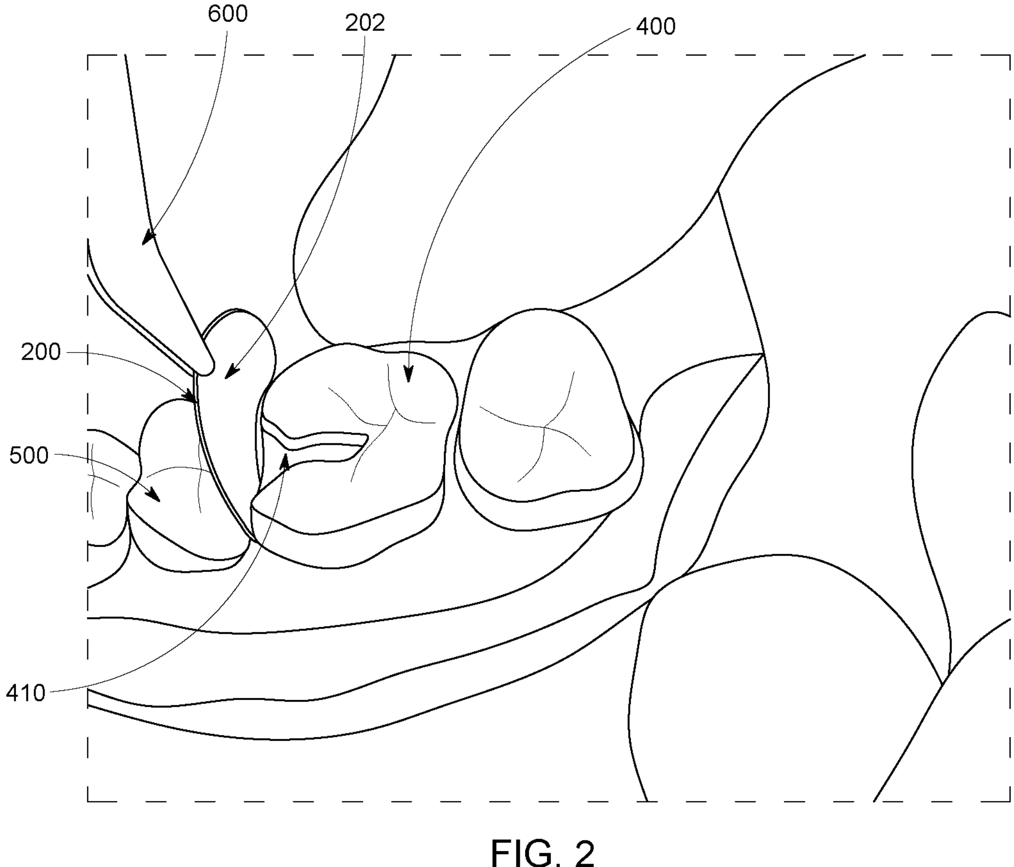
FIG. 2 shows a perspective view of the dental matrix being placed upon the side portion of a tooth that has a cavity of the improved dental matrix system and method for filling cavities according to the preferred embodiment of the present invention of FIG. 1.
Figure 3:
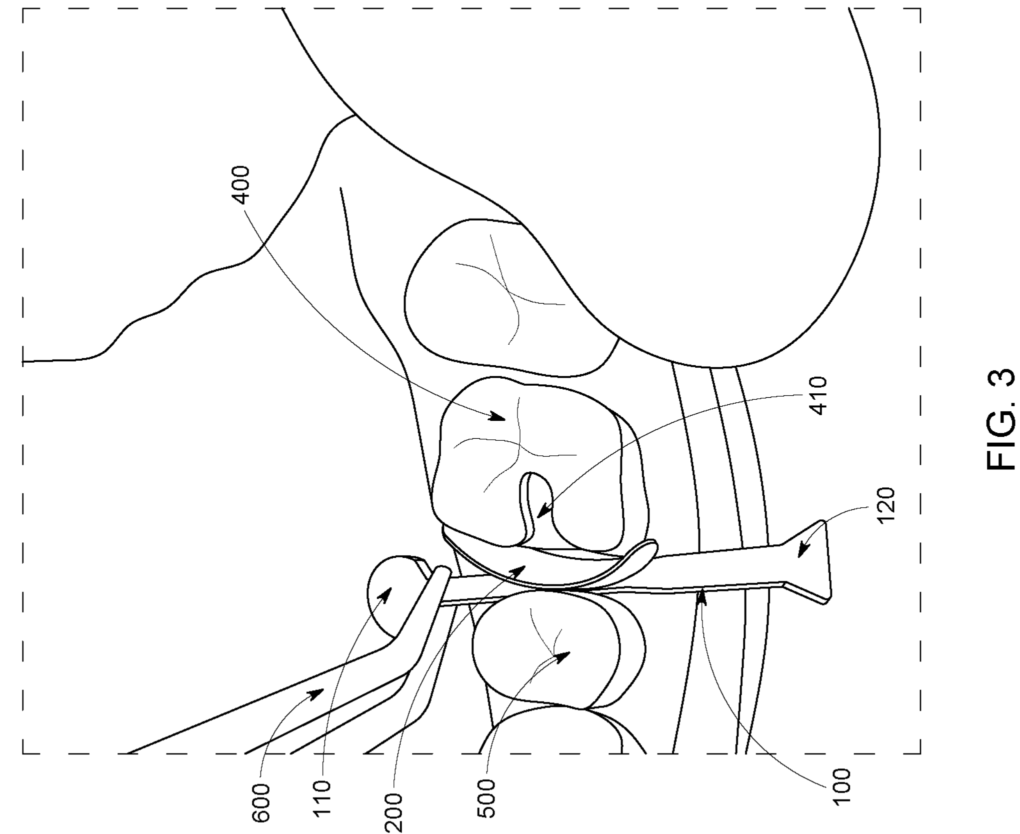
FIG. 3 shows a perspective view of the improved inter-proximal elastomeric dental wedge being placed between the dental matrix and an adjacent tooth of the improved dental matrix system and method for filling cavities according to the preferred embodiment of the present invention of FIG. 1.
Figure 4:
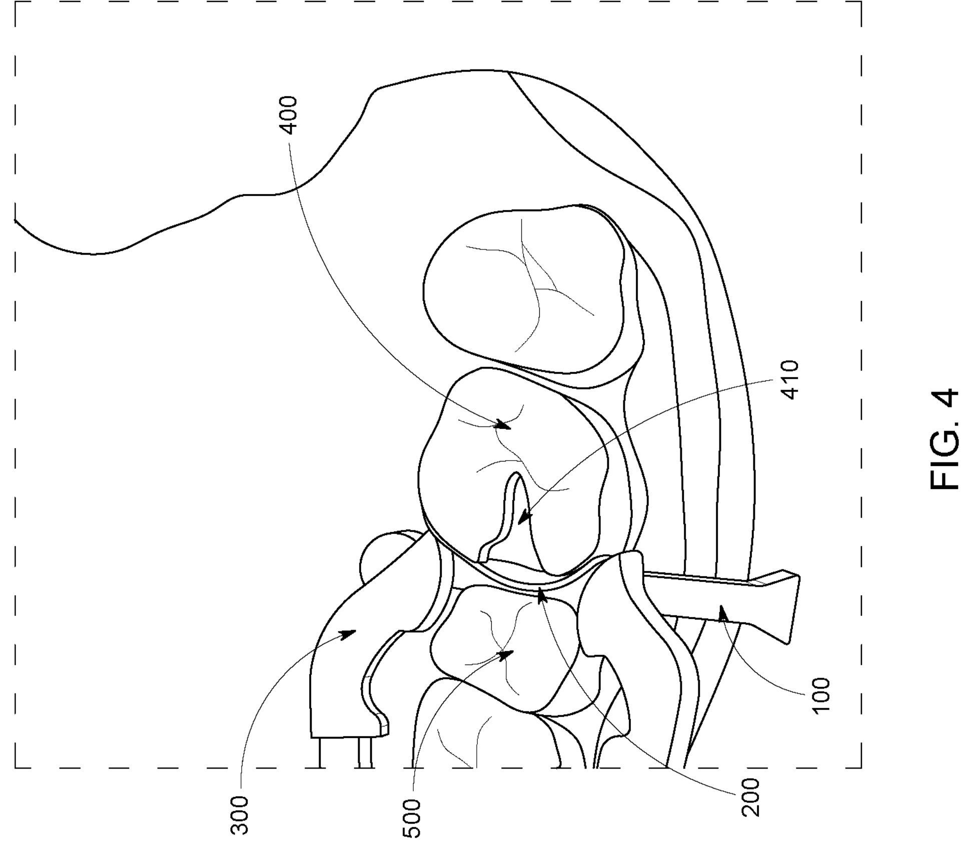
FIG. 4 shows a perspective view of the dental spring ring placed around an adjacent tooth and contacting the dental matrix of the improved dental matrix system and method for filling cavities according to the preferred embodiment of the present invention of FIG. 1.
Figure 5:
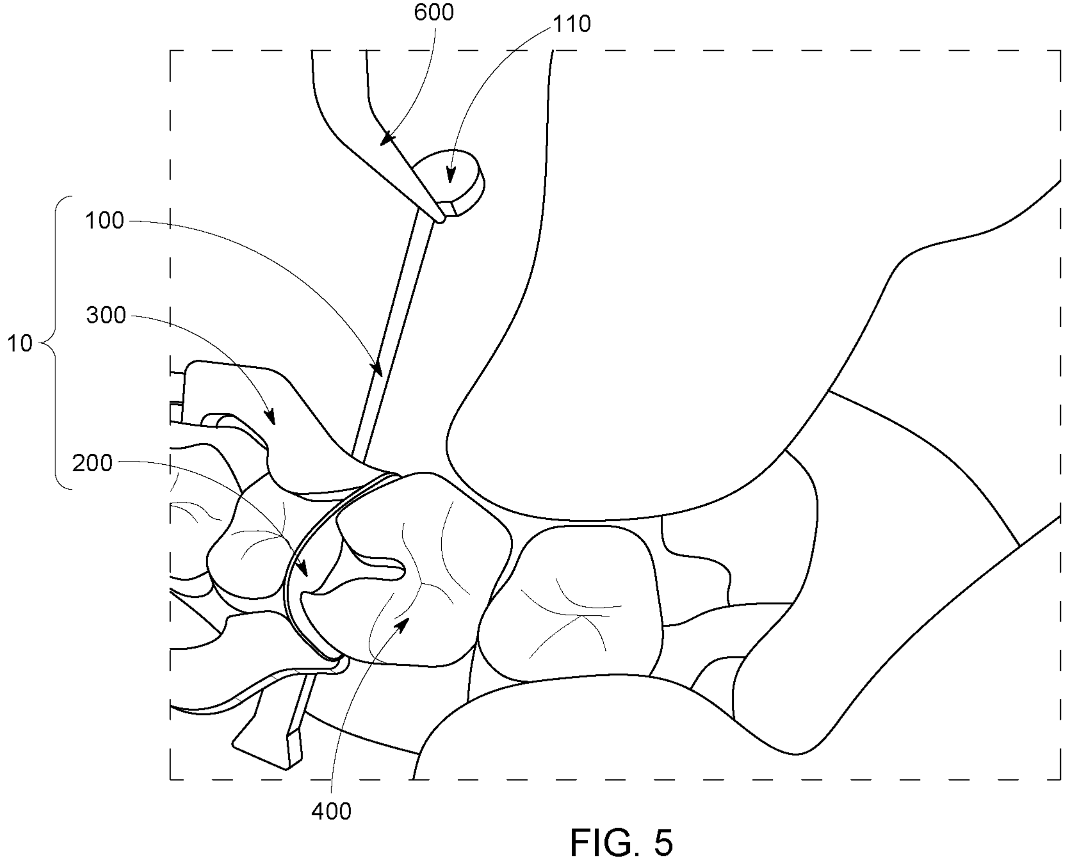
FIG. 5 shows a perspective view of the improved inter-proximal elastomeric dental wedge being pulled, elongated, and wedging between the adjacent tooth and the dental matrix of the improved dental matrix system and method for filling cavities according to the preferred embodiment of the present invention of FIG. 1.
Figure 6:
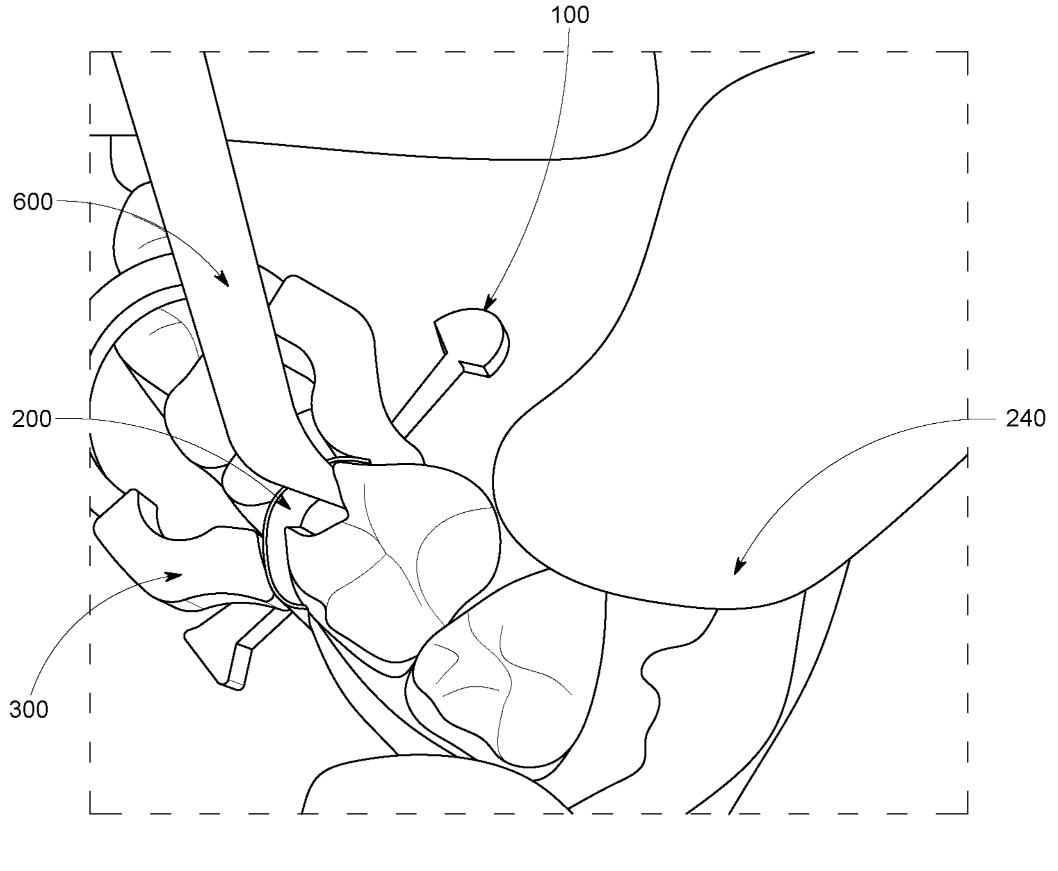
FIG. 6 shows a perspective view of the cavity being filled of the improved dental matrix system and method for filling cavities according to the preferred embodiment of the present invention of FIG. 1.
Figure 7:
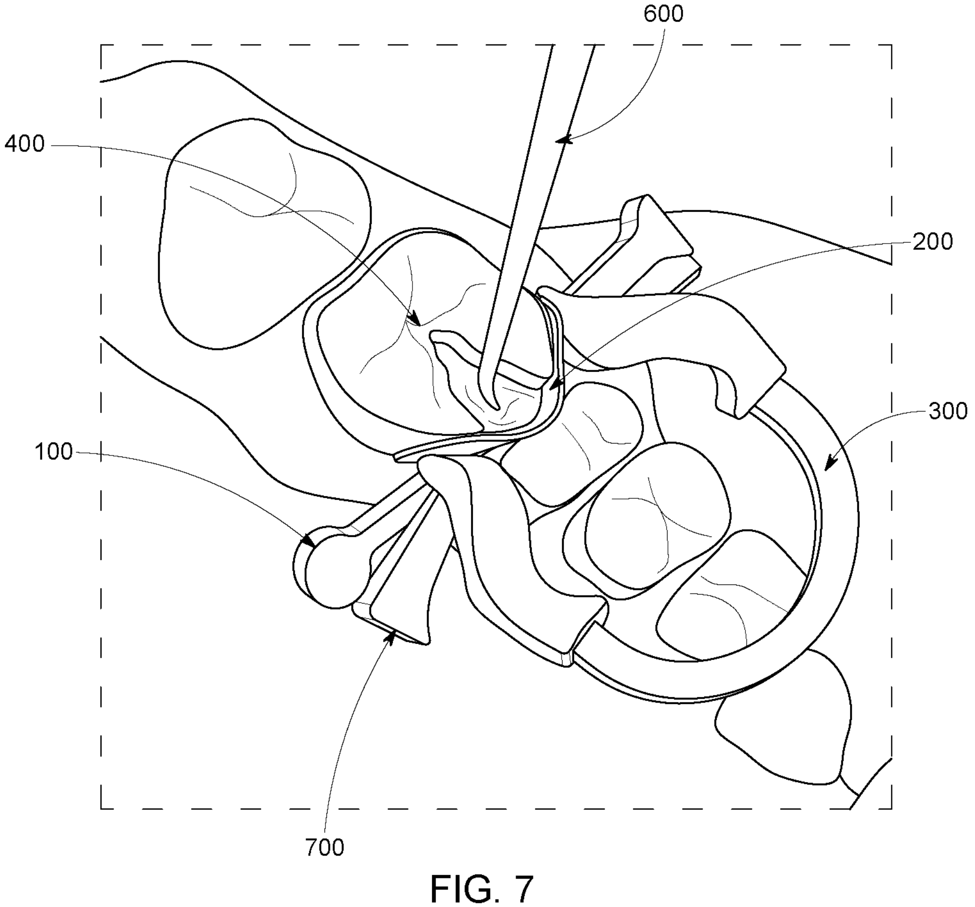
FIG. 7 shows the use of a second inter-proximal elastomeric dental wedge in conjunction with the first inter-proximal elastomeric dental wedge of the improved dental matrix system and method for filling cavities according to the preferred embodiment of the present invention of FIG. 1.
Figure 8:
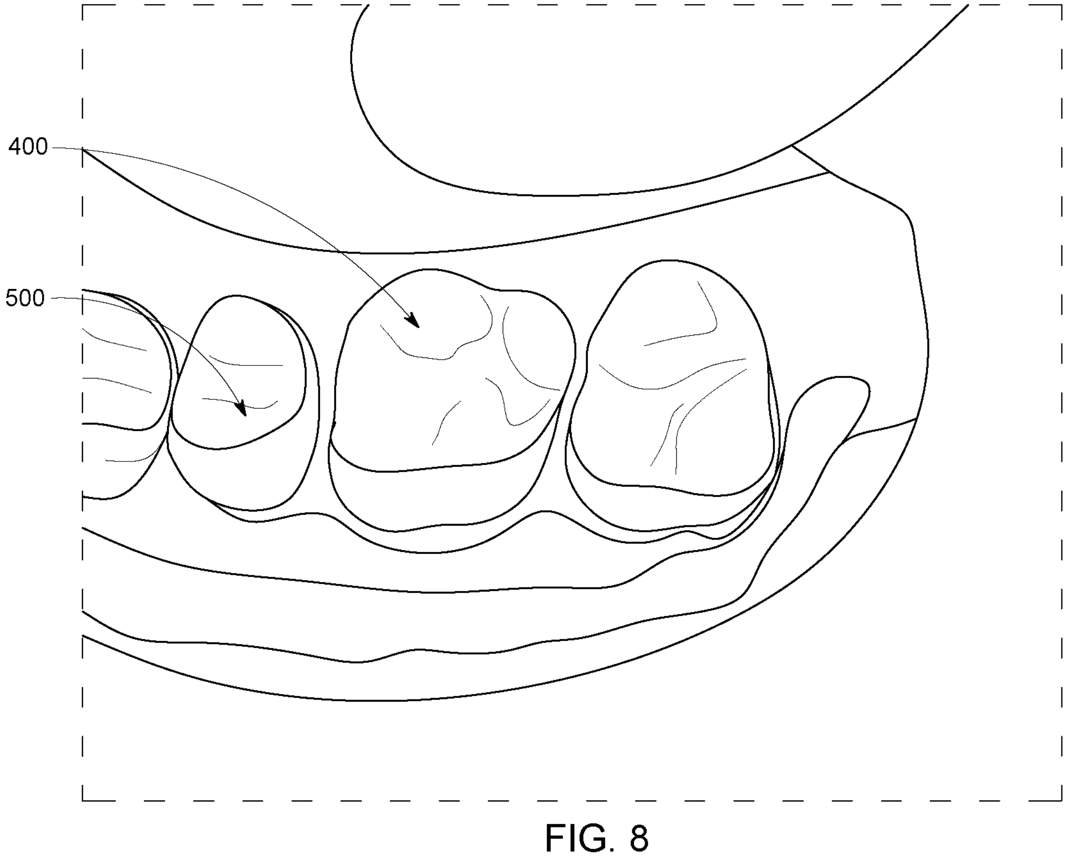
FIG. 8 shows the filling completed and the improved dental matrix system removed of the improved dental matrix system and method for filling cavities according to the preferred embodiment of the present invention of FIG. 1.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Turning now descriptively to drawing, referring to FIGS. 1-8, the present invention discloses an improved dental matrix system 10 for filling cavities located on a side portion of a tooth 400, comprising a dental matrix 200 having a curved cross-section wherein the dental matrix 200 is adapted to be placed in between a tooth 400 that has a cavity 410 on a side thereof and an adjacent tooth 500 and pressed against the side of the tooth 400 that has the cavity; a dental spring ring 300 adapted to be placed around the adjacent tooth 500 and contact the dental matrix 200 on opposite side portions thereof to hold the dental matrix in place against the tooth 400 that has the cavity; and an improved inter-proximal elastomeric dental wedge 100 comprising a tab end 110 having a width W1 and a length L1, a wedge end 120 having a width W2 and a length L2 and including a wedge surface 121, a center portion 130 including a first section 132 having a width W3 and a length L3 and is connected to the wedge end 120, wherein the width of the first section 132 is less than the width of the wedge end 120, a second section 134 having a width W4 and length L4 connected to the tab end 110, wherein the width of the second section 134 is less than the width of the first section 132, and a wedge section 136 having a width W3 and a L5 and including a wedge surface 137, wherein the wedge section 136 is connected in between the first section 132 and the second section 134. The improved inter-proximal elastomeric dental wedge 100 is formed from an elastomeric material, for example, rubber, plastic, silicone, and or other like materials, such that it can be deformed, elongated, and wedged in place between the dental matrix 200 and the adjacent tooth 500.

When in use, the dental matrix 200 is placed adjacent the side of the tooth 400 that has the cavity 410, then the dental wedge 100 is placed between the dental matrix 200 and the adjacent tooth 500, then the dental spring ring 300 is placed around the adjacent tooth 500 and contacts the dental matrix 200 on opposite side portions thereof to hold it in place against the tooth 400 that has the cavity, such that when pulling on the tab end 110 of the dental wedge via a dental tool 600, and subsequently the wedge end 120, the dental wedge 100 becomes elongated and pulls the center portion 130 further between the adjacent tooth 500 and the dental matrix 200 thereby wedging and pushing the dental matrix 200 toward and holding tightly against the tooth 400 that has the cavity. Once the improved dental matrix system 10 is properly in place the cavity can be filled and set more easily and precisely than with prior art systems and methods due to its improved adaptation and sealing of the dental matrix against the base of the prepared cavity area, and in following, the improved dental matrix system 10 is then removed. Furthermore, the cross-section of the dental matrix 200 forms a concave surface 202 and a convex surface, wherein the concave surface is the surface that contacts the tooth that has the cavity.

In the preferred embodiment of the improved inter-proximal elastomeric dental wedge, illustrated in FIG. 1, the width W1 of the tab end 110 is larger than the width W3 of the first section 132 of the center portion 130. The tab end 110 can be formed having a circular shape adapted to be grabbed and pulled by a dental tool, although other shapes that make grabbing with a dental tool easier may be incorporated instead. Further, the width W2 of the wedge end 120 is larger than the width W3 of the first section 132 of the center portion 130, and the width W4 of the second section 134 of the center section 130 is less than the width W3 of the first section 132. The wedge surface 121 of the wedge end 120 and the wedge surface 137 of the wedge section 136 of the center portion 130 are formed at an angle, respectively 123 and 139, with respect to the respective lengths between 30 degrees and 60 degrees, and in some instances the angle of both, respectively 123 and 139, are set at 45 degrees, though other angles may be preferred in particular instances. Furthermore, in the preferred embodiment, the wedge surface 121 of the wedge end 120 and the wedge surface 137 of the wedge section 136 of the center portion 130 are located on the same side of the dental wedge, such that both wedge surfaces are adapted to contact and push the dental matrix 200 toward and hold tightly against the tooth 400 having the cavity on its side portion. Furthermore, the side portion of the improved inter-proximal elastomeric dental wedge opposite from the wedge surface of the wedge end, the first section of the center portion, the wedge surface of the wedge section of the center portion, and the second section of the center portion, connect, align, and extend linearly to form a straight edge side 141 of said improved inter-proximal elastomeric dental wedge. Furthermore, the wedge end 120 may be formed having a side portion 124 formed in the shape of a triangle adapted to be grabbed and pulled by a dental tool 600, although other shapes that make grabbing with a dental tool easier may be incorporated instead.

In a further embodiment of the improved dental matrix system, a second improved inter-proximal elastomeric dental wedge 700 can be incorporated and adapted to be placed between the dental matrix and the adjacent tooth in an opposite direction to and on top of the first improved inter-proximal elastomeric dental wedge, such that after situating the first improved inter-proximal elastomeric dental wedge, the second improved inter-proximal elastomeric dental wedge is pulled on its tab end via a dental tool 600, and subsequently on its wedge end, becomes elongated and pulls its center portion further between the dental matrix 200 and the adjacent tooth 500, thereby wedging and pushing the dental matrix 200 toward and more securely holding tightly against the tooth 400 having the cavity, along with the first improved inter-proximal elastomeric dental wedge 100, such that said cavity can be filled.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. An improved inter-proximal elastomeric dental wedge comprising:

a tab end;

wherein said tab end has a width and a length;

a wedge end including:

a wedge surface;

wherein said wedge end has a width and a length;

a center portion including:

a first section;

wherein said first section is connected to said wedge end;

wherein said first section has a width and a length; and wherein said width of said first section is less than said width of said wedge end;

a second section;

wherein said second section is connected to said tab end;

wherein said second section has a width and length; and wherein said width of said second section is less than said width of said first section; and a wedge section including:

a wedge surface;

wherein said wedge section has a width and a length;

wherein said wedge section is connected in between said first section and said second section;

wherein said width of said first section of said center section is less than said width of said wedge end; and wherein said width of said second section of said center section is less than said width of said first section of said center section;

wherein said improved inter-proximal elastomeric dental wedge is formed from an elastomeric material;

wherein said wedge surface of said wedge end and said wedge surface of said wedge section of said center portion are located on the same side of said improved inter-proximal elastomeric dental wedge, such that both wedge surfaces are adapted to contact and push said dental matrix toward and hold tightly against a tooth having a cavity on a side portion thereof;

wherein a side portion of said improved inter-proximal elastomeric dental wedge opposite from said wedge surface of said wedge end, said first section of said center portion, said wedge surface of said wedge section of said center portion, and said second section of said center portion, connect, alien, and extend linearly to form a straight edge side of said improved inter-proximal elastomeric dental wedge; and wherein said improved inter-proximal elastomeric dental wedge is adapted to be placed between a dental matrix and an adjacent tooth, such that when pulling on said tab end, and subsequently on said wedge end, said improved inter-proximal elastomeric dental wedge is adapted to become elongated and pull said center portion further between said dental matrix and said adjacent tooth and thereby wedging and pushing said dental matrix toward and holding tightly against a tooth having a cavity on a side portion thereof, such that said cavity can be filled.

2. The improved inter-proximal elastomeric dental wedge of claim 1, wherein said width of said tab end is larger than said width of said first section of said center portion.

3. The improved inter-proximal elastomeric dental wedge of claim 1, wherein said width of said wedge end is larger than said width of said first section of said center portion.

4. The improved inter-proximal elastomeric dental wedge of claim 1, wherein said tab end is formed having a circular shape adapted to be grabbed and pulled by a dental tool.

5. The improved inter-proximal elastomeric dental wedge of claim 1, wherein said wedge surface of said wedge end and said wedge surface of said wedge section of said center portion are formed at an angle with respect to said respective lengths between 30 degrees and 60 degrees.

6. The improved inter-proximal elastomeric dental wedge of claim 5, wherein said wedge surface of said wedge end and said wedge surface of said wedge section of said center portion are formed at an angle with respect to said respective lengths of 45 degrees.

7. The improved inter-proximal elastomeric dental wedge of claim 1, wherein said wedge end has a side portion formed in the shape of a triangle adapted to be grabbed and pulled by a dental tool.

8. An improved dental matrix system for filling cavities located on a side portion of a tooth, comprising:

a dental matrix:

wherein said dental matrix has a curved cross-section; and wherein said dental matrix is adapted to be placed in between a tooth that has a cavity on a side thereof and an adjacent tooth, and pressed against said side of said tooth that has said cavity;

a dental spring ring;

wherein said dental spring ring is adapted to be placed around said adjacent tooth and contact said dental matrix on opposite side portions thereof to hold said dental matrix in place against said tooth that has said cavity; and an improved inter-proximal elastomeric dental wedge comprising:

a tab end;

wherein said tab end has a width and a length;

a wedge end including:

a wedge surface;

wherein said wedge end has a width and a length;

a center portion including:

a first section;

wherein said first section is connected to said wedge end;

wherein said first section has a width and a length; and wherein said width of said first section is less than said width of said wedge end;

a second section;

wherein said second section is connected to said tab end;

wherein said second section has a width and length; and wherein said width of said second section is less than said width of said first section; and a wedge section including:
a wedge surface;
wherein said wedge section has a width and a length;
wherein said wedge section is connected in between said first section and said second section;
wherein said width of said first section of said center section is less than said width of said wedge end; and wherein said width of said second section of said center section is less than said width of said first section of said center section;
wherein said wedge surface of said wedge end and said wedge surface of said wedge section of said center portion are located on the same side of said improved inter-proximal elastomeric dental wedge, such that both wedge surfaces are adapted to contact and push said dental matrix toward and hold tightly against a tooth having a cavity on a side portion thereof;
wherein a side portion of said improved inter-proximal elastomeric dental wedge opposite from said wedge surface of said wedge end, said first section of said center portion, said wedge surface of said wedge section of said center portion, and said second section of said center portion, connect, alien, and extend linearly to form a straight edge side of said improved inter-proximal elastomeric dental wedge; and
wherein said improved inter-proximal elastomeric dental wedge is formed from an elastomeric material;
wherein when in use said dental matrix is adapted to be placed adjacent said side of said tooth that has said cavity, then said dental wedge is adapted to be placed between said dental matrix and said adjacent tooth, then said dental spring ring is adapted to be placed around said adjacent tooth and contact said dental matrix on opposite side portions thereof to hold it in place against said tooth that has said cavity, such that when pulling on said tab end of said dental wedge, and subsequently said wedge end, said dental wedge becomes elongated and pulls said center portion further between said adjacent tooth and said dental matrix thereby wedging and pushing said dental matrix toward and holding tightly against said tooth that has said cavity, such that said cavity can be filled.

9. The improved dental matrix system of claim 8, wherein said width of said tab end is larger than said width of said first section of said center portion; and wherein said tab end is formed having a circular shape adapted to be grabbed and pulled by a dental tool.

10. The improved dental matrix system of claim 8, wherein said width of said wedge end is larger than said width of said first section of said center portion.

11. The improved dental matrix system of claim 8, wherein said wedge surface of said wedge end and said wedge surface of said wedge section of said center portion are formed at an angle with respect to said respective lengths between 30 degrees and 60 degrees.

12. The improved dental matrix system of claim 11, wherein said wedge surface of said wedge end and said wedge surface of said wedge section of said center portion are formed at an angle with respect to said respective lengths of 45 degrees.

13. The improved dental matrix system of claim 8, wherein said wedge end has a side portion formed in the shape of a triangle adapted to be grabbed and pulled by a dental tool.

14. The improved dental matrix system of claim 8, wherein said curved cross-section of said dental matrix forms a concave surface and a convex surface, wherein said concave surface is adapted to contact said tooth that has said cavity.

15. The improved dental matrix system of claim 8, further comprising:
a second improved inter-proximal elastomeric dental wedge comprising:
a tab end;
wherein said tab end has a width and a length;
a wedge end including:
a wedge surface;
wherein said wedge end has a width and a length;
a center portion including:
a first section;
wherein said first section is connected to said wedge end;
wherein said first section has a width and a length; and
wherein said width of said first section is less than said width of said wedge end;
a second section;
wherein said second section is connected to said tab end;
wherein said second section has a width and length; and
wherein said width of said second section is less than said width of said first section; and
a wedge section including:
a wedge surface;
wherein said wedge section has a width and a length;
wherein said wedge section is connected in between said first section and said second section;
wherein said second improved inter-proximal elastomeric dental wedge is formed from an elastomeric material;
wherein said width of said first section of said center section is less than said width of said wedge end; and wherein said width of said second section of said center section is less than said width of said first section of said center section;
wherein said wedge surface of said wedge end and said wedge surface of said wedge section of said center portion are located on the same side of said improved inter-proximal elastomeric dental wedge, such that both wedge surfaces are adapted to contact and push said dental matrix toward and hold tightly against a tooth having a cavity on a side portion thereof;
wherein a side portion of said improved inter-proximal elastomeric dental wedge opposite from said wedge surface of said wedge end, said first section of said center portion, said wedge surface of said wedge section of said center portion, and said second section of said center portion, connect, alien, and extend linearly to form a straight edge side of said improved inter-proximal elastomeric dental wedge; and
wherein said second improved inter-proximal elastomeric dental wedge is adapted to be placed between said dental matrix and said adjacent tooth in an opposite direction to and on top of the first improved inter-proximal elastomeric dental wedge, such that after situating the first improved inter-proximal elastomeric dental wedge, said second improved inter-proximal elastomeric dental wedge is pulled on its tab end, and subsequently on its wedge end, and said second improved inter-proximal elastomeric dental wedge becomes elongated and pulls its center portion further between said dental matrix and said adjacent tooth and thereby wedging and pushing said dental matrix toward and more securely holding tightly against said tooth having a cavity on a side portion thereof, such that said cavity can be filled.

16. The improved dental matrix system of claim 15, wherein said wedge surface of said wedge end and said wedge surface of said wedge section of said center portion of the second improved interproximal elastomeric dental wedge are formed at an angle with respect to said respective lengths between 30 degrees and 60 degrees.

* * * * *